(12) United States Patent
Priedemann et al.

(10) Patent No.: US 11,570,979 B2
(45) Date of Patent: Feb. 7, 2023

(54) BIRD DETERRENT DEVICE AND ARRANGEMENT

(71) Applicant: Priedemann Facade-Lab GmbH, Großbeeren (DE)

(72) Inventors: Wolfgang Priedemann, Berlin (DE); Paul-Rouven Denz, Berlin (DE)

(73) Assignee: PRIEDEMANN FACADE-LAB GMBH, Großbeeren (DE)

( * ) Notice: Subject to any disclaimer, the term of this patent is extended or adjusted under 35 U.S.C. 154(b) by 241 days.

(21) Appl. No.: 16/625,849

(22) PCT Filed: Jun. 27, 2018

(86) PCT No.: PCT/DE2018/100591
§ 371 (c)(1),
(2) Date: Dec. 23, 2019

(87) PCT Pub. No.: WO2019/001640
PCT Pub. Date: Jan. 3, 2019

(65) Prior Publication Data
US 2020/0120920 A1     Apr. 23, 2020

(30) Foreign Application Priority Data

Jun. 27, 2017   (DE) .................... 10 2017 114 261.4

(51) Int. Cl.
*A01M 29/06*     (2011.01)
(52) U.S. Cl.
CPC .................... *A01M 29/06* (2013.01)
(58) Field of Classification Search
CPC ...... A01M 29/00; A01M 29/06; A01M 29/08; G06T 15/025; G03B 33/14
USPC .......................................................... 40/454
See application file for complete search history.

(56) References Cited

U.S. PATENT DOCUMENTS

| | | | | |
|---|---|---|---|---|
| 1,985,730 | A * | 12/1934 | Ives | G03B 33/14 |
| | | | | 355/34 |
| 7,312,926 | B2 * | 12/2007 | Hunt | G03B 35/24 |
| | | | | 359/455 |
| 7,654,217 | B2 * | 2/2010 | Sullivan | A01M 29/06 |
| | | | | 116/22 A |
| 9,192,152 | B1 * | 11/2015 | Sparks | A45B 3/00 |
| 10,526,243 | B2 * | 1/2020 | Ridealgh | A01M 29/08 |

(Continued)

FOREIGN PATENT DOCUMENTS

| DE | 29610206 U1 | 10/1996 |
|---|---|---|
| DE | 202010015431 U1 | 5/2011 |

(Continued)

OTHER PUBLICATIONS

International Search Report dated Sep. 12, 2018 for PCT/DE2018/100591.

(Continued)

*Primary Examiner* — Christopher P Ellis
(74) *Attorney, Agent, or Firm* — Schmeiser, Olsen & Watts, LLP

(57) ABSTRACT

A bird deterrent device with a component which is set up to be arranged at a building envelope, and at which a lenticular image at least partially covers a visible surface is provided. Further, provided is an arrangement with a building envelope and a bird deterrent device which is arranged at the building envelope.

3 Claims, 1 Drawing Sheet

(56) References Cited

U.S. PATENT DOCUMENTS

Figure 1:
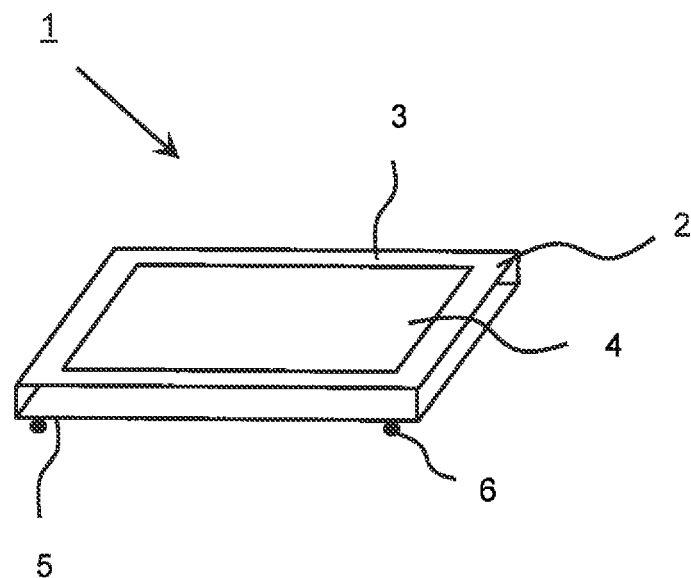

| | | | | |
|---|---|---|---|---|
| 2004/0027311 | A1* | 2/2004 | Hunt | G09F 19/14 |
| | | | | 345/4 |
| 2008/0178791 | A1* | 7/2008 | Sullivan | A01M 29/06 |
| | | | | 116/22 A |
| 2008/0271351 | A1* | 11/2008 | Crawford | G03B 25/02 |
| | | | | 40/454 |
| 2009/0047487 | A1* | 2/2009 | Klem, Jr. | A01M 29/06 |
| | | | | 428/210 |
| 2012/0113519 | A1* | 5/2012 | Klem, Jr. | A01M 29/06 |
| | | | | 359/597 |
| 2012/0285106 | A1* | 11/2012 | Donoho | A01M 29/06 |
| | | | | 52/203 |
| 2014/0259858 | A1* | 9/2014 | Canfield | A01M 29/28 |
| | | | | 43/2 |
| 2014/0259879 | A1 | 9/2014 | Logsdon | |
| 2015/0027029 | A1* | 1/2015 | Mager | A01M 31/06 |
| | | | | 43/2 |
| 2015/0320030 | A1* | 11/2015 | Sabine | E04B 1/72 |
| | | | | 119/713 |
| 2016/0010827 | A1* | 1/2016 | Uozu | F21V 3/049 |
| | | | | 362/235 |
| 2016/0255827 | A1* | 9/2016 | Betts, Jr. | A01M 29/34 |
| 2017/0020123 | A1* | 1/2017 | Arnold | B23K 26/0006 |
| 2020/0156784 | A1* | 5/2020 | Carnell | A01M 31/002 |
| 2020/0396983 | A1* | 12/2020 | Sobolev | B32B 17/10788 |
| 2021/0144989 | A1* | 5/2021 | Hannum | G08B 25/10 |

FOREIGN PATENT DOCUMENTS

| | | |
|---|---|---|
| DE | 202011106690 U1 | 11/2011 |
| DE | 202013004544 U1 | 6/2013 |
| DE | 102012007521 A1 | 10/2013 |
| DE | 102013212938 A1 | 1/2014 |
| DE | 20 2016 003 093 U1 | 8/2016 |
| DE | 202016003093 U1 | 8/2016 |
| GB | 2510405 A | 8/2014 |
| JP | 2007259794 A | 10/2007 |
| JP | 2011-155856 A | 8/2011 |
| KR | 20110008394 U | 8/2011 |
| KR | 20120069001 A | 6/2012 |

OTHER PUBLICATIONS

International Preliminary Report on Patentability dated Dec. 31, 2019 for PCT/DE2018/100591.

* cited by examiner

BIRD DETERRENT DEVICE AND ARRANGEMENT

CROSS-REFERENCE TO RELATED APPLICATIONS

This application claims priority to PCT Application No. PCT/DE2018/100591, having a filing date of Jun. 27, 2018, based on German Application No. 10 2017 114 261.4, having a filing date of Jun. 27, 2017, the entire contents both of which are hereby incorporated by reference.

FIELD OF TECHNOLOGY

The following relates to a bird deterrent device as well as to an arrangement with a building envelope and a bird deterrent device.

BACKGROUND

Bird deterrent devices are used in particular to prevent damage to buildings caused by birds.

Document DE 10 2012 007 521 A1 describes a device for deterring birds with a rotor, which is deflected out of a stable equilibrium position as birds seek a foothold in such a way that the birds seeking a foothold there cannot hold on. The rotor has at least one presentation area, wherein the presentation area is tilted relative to the middle of a rotational axis.

Document DE 20 2016 003 093 U1 discloses a pigeon deterrent to prevent contamination on streetlamps, which uses time-variable magnetic fields to disrupt the magnetoception of the birds.

Document DE 20 2013 004 544 U1 discloses a multi-function illuminating device for naturally attracting and/or repelling vermin and rodents of all kinds.

Document DE 296 10 206 U1 discloses an electrical protection device against birds. Document 20 2010 015 431 U1 discloses a device for scaring away and deterring flight-capable birds, especially seagulls. The device has several wires, which are welded with a piston at the end, and can be displaceably guided on a pipe. An attachment is provided for a thin wire rope, whose end has a strap for a handgrip. Also provided is an end piece, which guides the wires and is located above on the pipe. End caps are pressed onto the end of the wires. Welded on rings are used for installation on a ship.

Document 10 2013 212 938 A1 discloses a bird repellant device, which includes a loudspeaker and a loudspeaker control unit. The loudspeaker control unit controls the loudspeaker for emitting an ultrasonic wave in a predetermined region, so that the ultrasonic wave is modulated to an audible frequency while being transmitted through the air, in order to generate a repelling noise with the audible frequency in the predetermined region so as to repel birds.

Document DE 20 2011 106 690 U1 discloses a surface finish for interiors comprised of a carrier, a lens or prism raster image applied to the carrier, and a transparent protective layer that insulates the lens or prism raster image.

SUMMARY

An aspect relates to an improved bird deterrent device that can be flexibly used and be adjustable to different applications.

According to one aspect, a bird deterrent device is provided, which has a component set up to be arranged at a building envelope, and at which a lenticular image at least partially covers a visible surface.

Another aspect provides an arrangement with a building envelope and a bird deterrent device, which is arranged at the building envelope. The bird deterrent device is formed with a component at which a lenticular image at least partially covers a visible surface on the flat component.

The technologies are used to prevent damage to structures and hygienic contamination from pigeon droppings, and to diminish the economic damage associated therewith.

In the various embodiments, the bird deterrent device can be arranged on the building envelope or be integrated therein. The lenticular effect, for example the appearance of various images in the area of the lenticular image depending on the viewing angle on the lenticular image, is used in the bird deterrent device to prevent the birds from landing in the area of the bird deterrent device. Depending on the viewing angle, various images or filmstrips become visible to the birds on the building envelope, which can create the impression of moving images for the birds. Alternatively or additionally, the lenticular effect can involve a so-called fly-eye effect when lenticular films are used, which have a plurality of point lenses instead of directed lens grooves. As a result, the image acts from all viewing directions, while the effect depends on the angle in conventional lenticular films.

Landings are prevented by unnerving/irritating/optically annoying the birds on the parts of the building envelope provided with the bird deterrent device. There is a changed effect for the bird during each attempted approach due to the changing approach behavior such as angle of approach and/or speed. This prevents any habituation effect in the birds and ensures the prolonged effectiveness of the bird deterrent device.

For example, installation in the building envelope can take place as follows: Arrangement in the gap between the panes of a double glazing, lamination into a composite glass, or a glass pane replaces the lenticular film with the corresponding surface structure.

The component can be formed with a plate material and/or a film material. The plate material or film material can consist of a UV-resistant, transparent plastic.

The component can be designed as a façade component or façade cladding component. The component can be opaque.

The façade cladding component can be a windowpane or a façade glazing.

At the component, an installation surface can have an adhesive. The installation surface can be arranged on the rear side of the component, so that the adhesive is arranged on the rear side of the component. The adhesive can be a glue or tape, for example an adhesive film on the component.

An attachment device can also be arranged at the component. Alternatively or additionally to installing the component by means of the adhesive, the attachment device can be set up to attach the component to the building envelope, so that the component is installed on the building envelope or integrally in the latter. For example, a rivet and/or screw connection and/or a clamping device and/or a click connection and/or a Velcro connection can be provided for fastening purposes.

The component can be set up to be split into several partial components in separating processes, wherein at the partial components, the respective visible surface is covered at least partially by an assigned lenticular image. An embodiment can provide that the component in which the visible surface is at least partially covered with the lenticular image be provided as the material on a roller, so that partial components can be separated from the roller, for example with scissors, so as to provide application-related, tailored partial components with a lenticular image for the bird deterrent device.

The component can be arranged with a carrier component made out of a carrier material from the following group of carrier materials: Metal, natural stone, ceramics, glass, plastic, composite material, and concrete. For example, the carrier material can be a plate, a building block or a concrete component. For example, the lenticular image can be arranged on the carrier component by arranging the plate or film material with the lenticular image hereon.

The component can be a flat component.

The embodiments described in conjunction with the bird deterrent device can be provided mutatis mutandis in connection with the arrangement. Alternative exemplary examples to the arrangement will be described below.

The bird deterrent device can be arranged on a surface portion of the building envelope aligned horizontally or inclined to the horizontal direction.

The surface portion aligned horizontally or inclined to the horizontal direction can be a potential standing or landing surface for birds on the building envelope.

The visible surface with the lenticular image on the building envelope can be aligned horizontally or inclined to the horizontal direction.

The component can be arranged on a carrier component.

In particular, surfaces of the building envelope aligned horizontally or inclined to the horizontal direction can be used by birds for their approach. This allows there to be standing or landing surfaces for the birds. A deterrent protection is especially important in the area of such building envelope sections.

The lenticular image can have the following: shadows cast by birds of prey; distinguishing features of birds of prey (contours, feathering pattern, eyes, beak, etc.) and/or motifs of water, thorns, optical distortion of surface (staggered depth, protrusions and recesses, inclines, rounded portions, etc.), color contrasts and progressions and/or UV-reflecting colors (not visible to humans, visible to birds).

In this way, the lenticular effect (moving/changing/3D image via optical prisms, which make varying filmstrips visible depending on visual angle) can be integrated into the building envelope, for example in the horizontal (ledges, attics, protrusions, roof edges, etc.), so as to provide deterrent stimuli to fend off birds, for example feral pigeons and seagulls, or to prevent birds from landing on these surfaces.

In order to prevent birds from crashing into building envelopes, the component can also be fastened in the vertical direction or inclined to the vertical direction.

BRIEF DESCRIPTION

Figure 2:
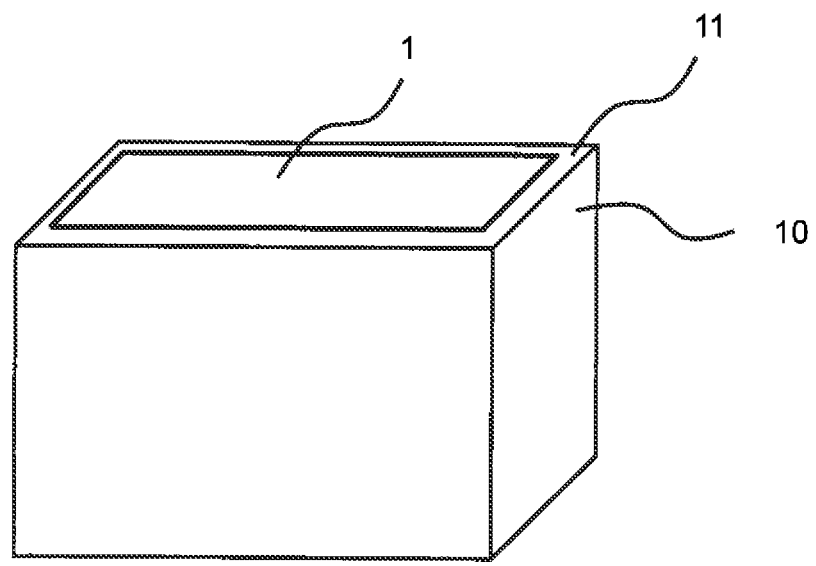

Some of the embodiments will be described in detail, with references to the following Figures, wherein like designations denote like members, wherein:

FIG. 1 is a schematic view of a bird deterrent device with a component in which a visible surface is at least partially covered by a lenticular image; and FIG. 2 is an arrangement with a section of a building envelope, which is protected by a bird deterrent device.

DETAILED DESCRIPTION

FIG. 1 presents a schematic view of a bird deterrent device 1 with a component 2, in which a visible surface 3 is for the most part covered by a lenticular image 4. Provided in the corner regions 5 is an attachment device 6, which is set up to install the bird deterrent device 1 on a building envelope (not shown), for example by means of a rivet or screw connection.

FIG. 2 presents a schematic view of a section of a building envelope 10 with a potential standing or landing surface for birds 11, which is covered by the bird deterrent device from FIG. 1.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. An arrangement, comprising:
   a building envelope;
   a surface portion of the building envelope which is a potential standing or landing surface for birds on the building envelope and is aligned horizontally or inclined to the horizontal direction;
   a bird deterrent device, which is fixed on the surface portion of the building envelope aligned horizontally or inclined to the horizontal direction;
   wherein:
      the bird deterrent device is provided with a flat component,
      the flat component is formed with at least one of a plate material and a film material made of a UV-resistant, transparent plastic or glass pane;
      a lenticular image at least partially covers a visible surface of the flat component, wherein the visible surface of the flat component provided with the lenticular image is aligned horizontally or inclined to the horizontal direction on the building envelope;
      on the rear side of the flat component an installation surface is provided with at least one of an adhesive and an attachment device; and
      the flat component is fixed to the building envelope by means of at least one of the adhesive and the attachment device.

2. The arrangement according to claim 1, wherein the component is designed as a façade component or a façade cladding component.

3. The arrangement according to claim 1, wherein the façade cladding component is a windowpane or a façade glazing.

* * * * *